INVENTOR.
CHARLES J. O'NEILL

Dec. 2, 1958 C. J. O'NEILL 2,862,727
TRAILER WHEEL SUSPENSION WITH LOAD VARYING ADJUSTMENT
Filed Feb. 1, 1954 2 Sheets-Sheet 2
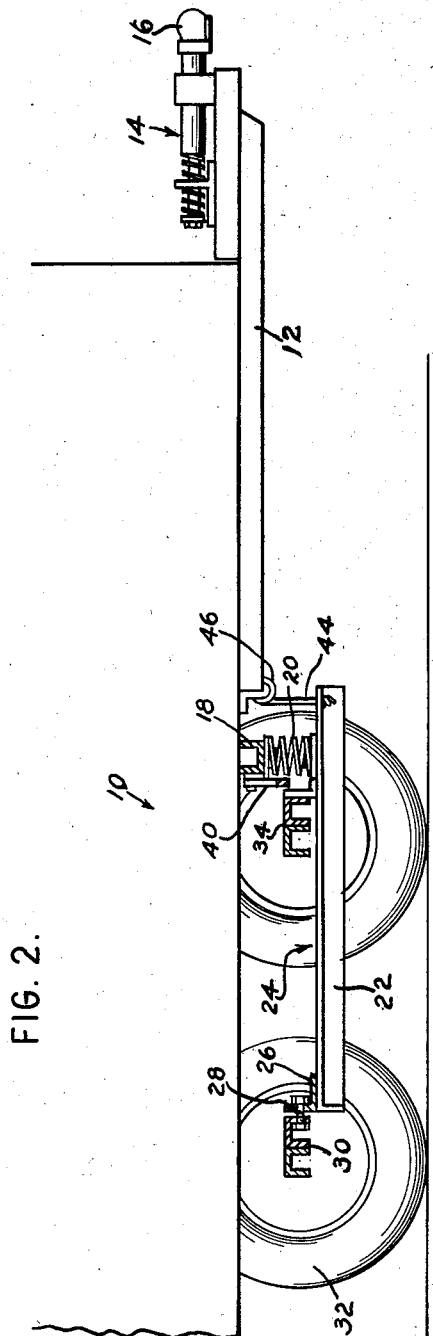
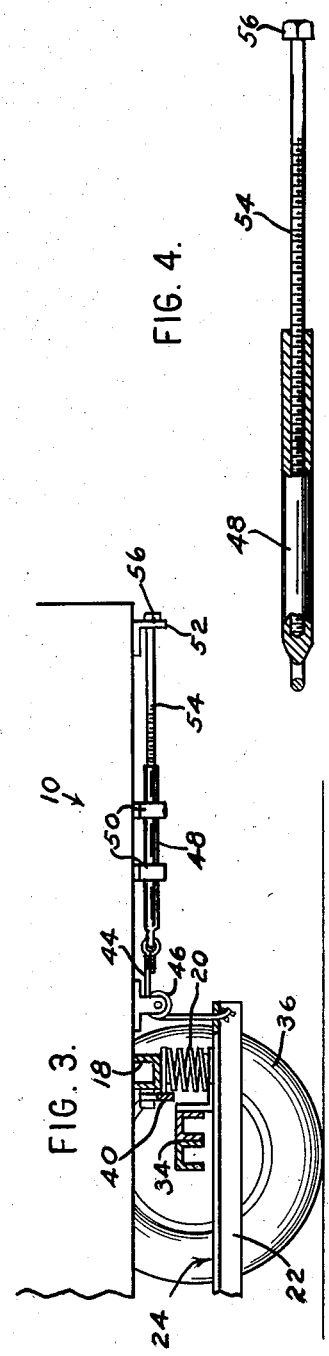
INVENTOR.
CHARLES J. O'NEILL
BY
*J. B. Dickman, Jr.*
ATTORNEY United States Patent Office 2,862,727
Patented Dec. 2, 1958

2,862,727

TRAILER WHEEL SUSPENSION WITH LOAD VARYING ADJUSTMENT

Charles J. O'Neill, Manteno, Ill.; Eugene T. O'Neill, administrator of said Charles J. O'Neill, deceased, assignor to Eugene T. O'Neill, individually Application February 1, 1954, Serial No. 407,218

3 Claims. (Cl. 280—405)

The present invention relates to a wheel suspension for a trailing vehicle and more particularly to the wheel suspension of a trailing vehicle of the type having a draft tongue which is designed to transmit a portion of the weight of the trailing vehicle and of the load carried thereby to a traction vehicle.

Virtually all trailing vehicles are so designed that at least a portion of the weight of the trailing vehicle and the load imposed thereon is transmitted to the traction vehicle so as to increase the tractive effort exerted upon a surface by the traction wheels of the traction vehicle.

The primary object of this invention is to vary the weight of a trailing vehicle that is transmitted to the traction vehicle.

Another object is to vary the height of the coupling of a trailing vehicle to accommodate mating couplings carried at different heights by traction vehicles and also to thereby select the weight of the load transmitted through the couplings to the traction vehicle.

The above and other objects may be attained by employing this invention which embodies among its features a sub-frame, pairs of ground wheels carried by the sub-frame for rotation adjacent opposite sides thereof about spaced parallel axes, a fulcrum carried by the sub-frame on the side of one pair of ground wheels remote from the other pair of ground wheels and connected to the trailing vehicle to support said vehicle in vertically spaced relation to the sub-frame, and means carried by the trailing vehicle and operatively connected to the sub-frame on the side of the fulcrum remote from the ground wheels for exerting effort on the sub-frame counter to effort exerted thereon by the weight of the vehicle on the fulcrum.

Other features include a stabilizing bar carried by the fulcrum and operatively connected to the sub-frame for arresting side sway between the sub-frame and the trailing vehicle.

In the drawings:

Figure 2 is a fragmentary sectional view taken substantially on the line 2—2 of Figure 1.

Figure 3 is a fragmentary sectional view taken substantially on the line 3—3 of Figure 1, and Figure 4 is an enlarged side view partly in section of a cable adjusting screw.

Figure 1:
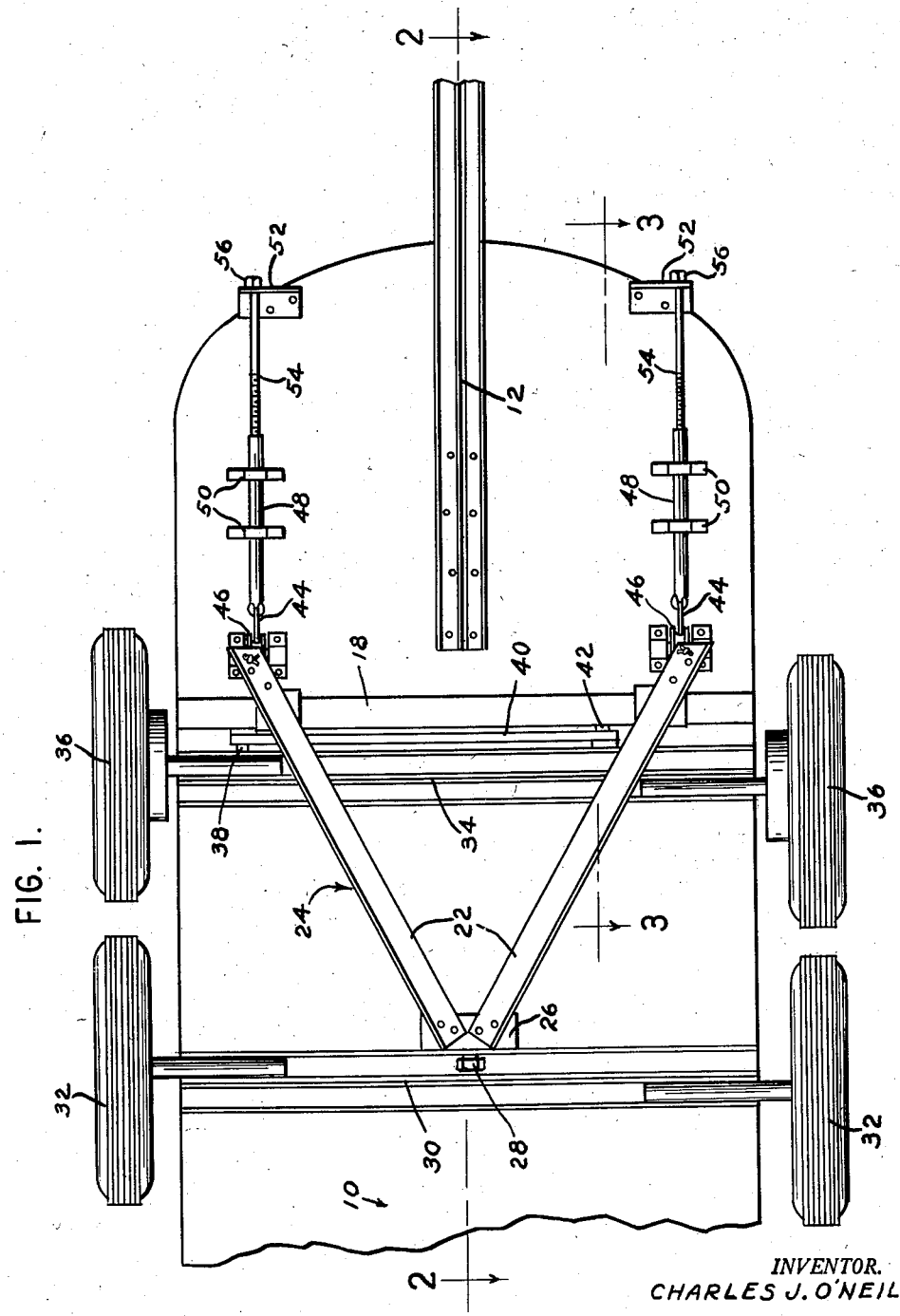
Figure 1 is a bottom plan view of a trailing vehicle embodying the features of this invention.

Referring to the drawings in detail a trailing vehicle designated generally 10 carries a draft tongue 12 which projects longitudinally beyond the leading end of the vehicle and carries at its forward end a coupling designated generally 14 carrying a coupling socket 16 which is adapted to receive the spherical coupling head of a conventional coupling carried by a traction vehicle (not shown). The tongue 12, coupling 14 and the socket 16 not only exert towing effort on the trailing vehicle but also transmit a portion of the weight of the trailing vehicle and the load carried thereby to the traction vehicle so as to increase the tractive effort of the traction wheels thereof on the surface being traversed.

Carried by the trailing vehicle and extending transversely therebeneath intermediate its ends is a bolster 18 carrying adjacent opposite ends compression coiled springs 20 to the lower ends of which are secured to the divergent side bars 22 of a V-shaped sub-frame designated generally 24. As shown in Figure 1 the side bars 22 converge as they recede from the springs 20 and their convergent ends carry a bracket 26 having a horizontally extending pivot stud 28. Rockably connected to the bracket 26 by the pivot stud 28 is a floating axle 30 which extends transversely across the trailing vehicle and carries adjacent opposite ends trail-ground wheels 32.

Carried by the side bars 22 of the V-shaped sub-frame 24 between the floating axle 30 and the springs 20 and near said springs is an axle 34 which extends transversely across the trailing vehicle near the bolster 18. Mounted for rotation on the axle 34 adjacent opposite sides of the vehicle are leading ground wheels 36 which as shown in Figure 1 track with the wheels 32.

Pivotally connected as at 38 to the axle 34 adjacent one side of the vehicles is a stabilizing bar 40 which extends diagonally upwardly and is connected as at 42 to the bolster 18 adjacent the opposite side of the vehicle 10 so as to arrest relative side sway between the vehicle 10 and the V-shaped sub-frame 24.

Secured to the side bars 22 forwardly of the springs 20 are cables 44 which extend upwardly and over pulleys 46 carried by the trailing vehicle 10 above the divergent ends of the side bars. As illustrated in Figure 3, the cables 44 extend beneath the trailing vehicle 10 toward the forward end thereof and are secured adjacent their forward ends in internally screw threaded tubular members 48. The tubular members 48 are mounted in longitudinally spaced guides 50 carried by the vehicle 10 to slide in said guides beneath the vehicle, and carried by the vehicle and depending therefrom adjacent the forward end thereof are brackets 52. Externally screw threaded studs 54 which threadedly engage the threads in the tubular members 48 extend through the brackets 52 and are provided with heads 56 which engage the brackets 52 and arrest rearward movement of the studs relative to the vehicle 10.

In use when it is desired to adjust the position of the vehicle 10 on its wheel suspension, the heads 56 of the studs 54 are turned to cause the tubular members 48 to move longitudinally in the guides 50 and thus to move the cables 44 so as to alter the angular relation of the vehicle 10 and the sub-frame 24. The structure is such that the V-shaped sub-frame 24 has a cantilever action with the bolster 18 and the springs 20 defining a fulcrum about which relative movement takes place as the cables 44 are adjusted. Obviously the greater the pull on the cables 44 the more will the springs 20 be compressed and the lower will be the draft tongue 12, and the coupling 14. Such elevation of the draft tongue and coupling tends to lighten the load transmitted to the traction vehicle so that not only differing heights of the mating couplings on the draft vehicles can be compensated for but the amount of the load transmitted to the traction vehicle may be varied.

I wish to have it understood that various changes may be made in the form, details, arrangement and proportions of the various parts without departing from the scope of my invention.

What is claimed is:

1. In a trailing vehicle of the type having a weight sustaining draft coupling adapted to be connected to a traction vehicle for towing the trailing vehicle and transmitting a part of the weight thereof to the traction vehicle, a running gear for the trailing vehicle comprising a V-shaped sub-frame connected to the trailing vehicle for rocking movement therebeneath in a substantially vertical arcuate path, and axle carried by the V-shaped sub-frame across its sides and extending transversely beneath the trailing vehicle adjacent the connection of the V-shaped sub-frame through compressed springs to said trailing vehicle, a floating axle carried pivotally at its middle on a horizontal axis by the apex of the sub-frame in rearwardly spaced substantially parallel relation to the first mentioned axle, ground wheels carried by the axles for rotation adjacent opposite sides of the trailing vehicle, and slidably adjustable rods carried by the trailing vehicle and operatively connected to the ends of the sides of the V-shaped sub-frame by cables for moving said V-shaped sub-frame in its vertical arcuate path about said spring connection to select the amount of the weight of the trailing vehicle to be transmitted through the draft coupling to the traction vehicle.

2. In a trailing vehicle of the type having a weight sustaining draft coupling adapted to be connected to a traction vehicle for towing the trailing vehicle and transmitting a part of the weight thereof to the traction vehicle, a running gear for the trailing vehicle comprising a bolster carried by and extending transversely across the bottom of the forward half of the trailing vehicle, a V-shaped sub-frame carried by the bolster through connecting springs fixed to the sides of the V frame for rocking movement of the sub-frame in a vertical arcuate path beneath the trailing vehicle, and axle carried by the sides of the V-shaped sub-frame to the rear of said springs and extending thereacross adjacent and substantially parallel with the bolster, ground wheels carried by the axle for rotation adjacent opposite sides of the trailing vehicle, a floating axle pivotally carried on a horizontal axis by the apex of the V-shaped sub-frame in longitudinally spaced substantially parallel relation to the first mentioned axle under the rear half of the trailer vehicle, ground wheels carried by the floating axle for rotation adjacent opposite sides of the trailing vehicle and in trailing relation to the first mentioned ground wheels, and slidably adjustable rods carried by the trailing vehicle and operatively connected to the ends of the sides of the V-shaped sub-frame by cables for moving said V-shaped sub-frame in its vertical arcuate path to select the amount of the weight of the trailing vehicle to be transmitted through the draft coupling to the traction vehicle.

3. In a trailer having a tractor coupling, an undercarriage having a front axle and a rear axle with wheels on opposite sides of said trailer for supporting the entire load of the trailer when the coupling is unattached and unsupported, a frame connecting said axles and extending forwardly of said front axle to provide a support for spring means firmly connected between the bottom of said trailer and said frame, and cable means for adjustably hanging the forward end of said frame from said trailer so as to change the level of said coupling as may be desired, said frame being of V-shape and having a horizontal pivotal connection at its apex to the middle of said rear axle, said spring means comprising a compressed coil spring on each side of the V-frame, said front axle being connected across the sides of said V-frame, said cable means consisting of a cable connected to the end of each side of the V-frame and passed upwardly over pulleys, and means on said trailer for adjustably drawing up on the ends of said cables to vary the length of the cables suspended between the frame and the pulleys and thus rock the trailer on each spring fulcrum when the coupling is unattached, or apportion the distribution of the load of the vehicle between the coupling, the front and the rear axles when the coupling is attached.

References Cited in the file of this patent

UNITED STATES PATENTS

| | | |
|---|---|---|
| 878,156 | Pratt | Feb. 4, 1908 |
| 1,981,593 | Fageol | Nov. 20, 1934 |
| 2,027,913 | Kneale | Jan. 14, 1936 |
| 2,344,921 | McDaniel | Mar. 21, 1944 |
| 2,410,241 | Schramm | Oct. 29, 1946 |
| 2,458,666 | Williams | Jan. 11, 1949 |
| 2,496,515 | Bayes | Feb. 7, 1950 |
| 2,698,758 | Ronning | Jan. 4, 1955 |

FOREIGN PATENTS

| | | |
|---|---|---|
| 541,887 | Germany | Jan. 18, 1933 |